(12) United States Patent
Reineck

(10) Patent No.: US 7,549,659 B2
(45) Date of Patent: Jun. 23, 2009

(54) MULTIPLE TRAILING ARM SUSPENSION

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 126 days.

(21) Appl. No.: 11/442,761

(22) Filed: May 30, 2006

(65) Prior Publication Data

US 2007/0278759 A1 Dec. 6, 2007

(51) Int. Cl.
*B60G 7/00* (2006.01)
*B60G 11/36* (2006.01)
*B60G 11/44* (2006.01)
*B60G 11/46* (2006.01)

(52) U.S. Cl. .......................... 280/124.17; 280/124.116; 280/124.174; 280/124.163

(58) Field of Classification Search .......... 280/124.116, 280/124.11, 124.156, 124.164, 124.166, 280/124.17, 124.174, 124.175, 124.124, 280/124.163, 119, 121, 694, 699, 718, 720, 280/135, 137, 680, 686
See application file for complete search history.

(56) References Cited

U.S. PATENT DOCUMENTS

| 1,705,705 | A | * | 3/1929 | Barthel | 280/124.17 |
|---|---|---|---|---|---|
| 3,434,707 | A | * | 3/1969 | Raidel | 267/31 |
| 3,782,753 | A | * | 1/1974 | Sweet et al. | 280/124.101 |
| 3,844,579 | A | * | 10/1974 | Cunha | 280/86.75 |
| 4,639,008 | A | * | 1/1987 | Krettenauer et al. | 280/405.1 |
| 5,251,886 | A | * | 10/1993 | Bursel | 267/229 |
| 5,351,986 | A | * | 10/1994 | Hedenberg et al. | 280/124.163 |
| 6,394,474 | B1 | * | 5/2002 | Warinner et al. | 280/124.104 |
| 6,485,040 | B1 | * | 11/2002 | Dudding | 280/124.175 |
| 7,195,260 | B2 | * | 3/2007 | Richardson | 280/124.128 |
| 2001/0052685 | A1 | * | 12/2001 | Svartz et al. | 280/124.116 |
| 2004/0188973 | A1 | * | 9/2004 | Molitor | 280/124.166 |
| 2006/0049600 | A1 | * | 3/2006 | Dudding et al. | 280/124.11 |
| 2006/0113744 | A1 | * | 6/2006 | Preijert | 280/124.163 |
| 2007/0114746 | A1 | * | 5/2007 | Tucker | 280/124.116 |
| 2007/0241527 | A1 | * | 10/2007 | Lie | 280/124.153 |

* cited by examiner

*Primary Examiner*—John Q. Nguyen
*Assistant Examiner*—Karen Amores
(74) *Attorney, Agent, or Firm*—Carlson, Gaskey & Olds PC

(57) ABSTRACT

A suspension that has particular application for a front axle of a heavy vehicle includes suspension arms that are better able to withstand increased brake torques that are expected to soon be mandated in heavy vehicles. In one embodiment, the suspension includes a plurality of arms pivotally connected to a vehicle frame, and rigidly secured to an axle. By utilizing the plurality of arms, simple spring elements are better able to withstand the increased brake torques.

19 Claims, 3 Drawing Sheets

MULTIPLE TRAILING ARM SUSPENSION

BACKGROUND OF THE INVENTION

This application relates to a suspension for an axle wherein a plurality of arms are pivotally connected to a vehicle frame, and rigidly connected to the axle.

Heavy vehicles, such as trucks, typically have an axle extending between opposed wheels, and connected to a vehicle frame through a suspension. The suspension must provide support between the axle and the vehicle, and must withstand a large number of forces.

One challenge with the design of modern heavy vehicle suspensions is that the brake torques on the axles are increasing. Federal regulations may be imposed which mandate increased brake torques to improve stopping distances. With this increase in brake torque on the axles, the suspensions that are utilized to mount the axles will need to be compatible with the higher brake torques. Current suspension design may not perform ideally during moderate to heavy braking efforts of a larger vehicle brake. A known suspension design, referred to as a "multi-link," may be able to better withstand the higher braking forces. This design includes a number of links pivotally connected to both the axle and the vehicle frame. However, these pivotal connections increase the cost of the associated suspension due to additional bushings and connection points that are required. Further, this multi-link system is typically an air suspension that adds complexity, and which has additional cost associated with air springs and related connecting components.

SUMMARY OF THE INVENTION

The proposed solution utilizes a pair of trailing suspension arms that are pivotally attached to one of a frame and an axle, but rigidly attached to the other. This provides a simple and low cost trailing arm design, but also adds the benefits of the multi-link design in terms of brake torque reaction. In a disclosed embodiment, two arms are used on each side of the axle. The four arms are preferably utilized on the front axle, where the increased brake torque will be centered. The four front arms also provide good lateral stiffness for performance handling. The arms are preferably spring steel, and can be made thick enough that the suspension is purely mechanical. Alternatively, the arms may be reduced in section and supplemented with an air spring to achieve a desired ride performance.

In various features of a disclosed embodiment, the arms are rigidly attached to the axle, with one link is placed on a vertically upper surface, and the other is placed on a vertically lower surface of the axle. Mounting structure for rigidly securing the arms to the axle include mounting plates that can also provide connection points for various components such as a lateral support rod, and/or a shock absorber.

In another embodiment, the arms are rigidly attached to the frame, and pivotally attached to the axle.

These and other features of the present invention can be best understood from the following specification and drawings, the following of which is a brief description.

DETAILED DESCRIPTION OF THE PREFERRED EMBODIMENT

Figure 1:
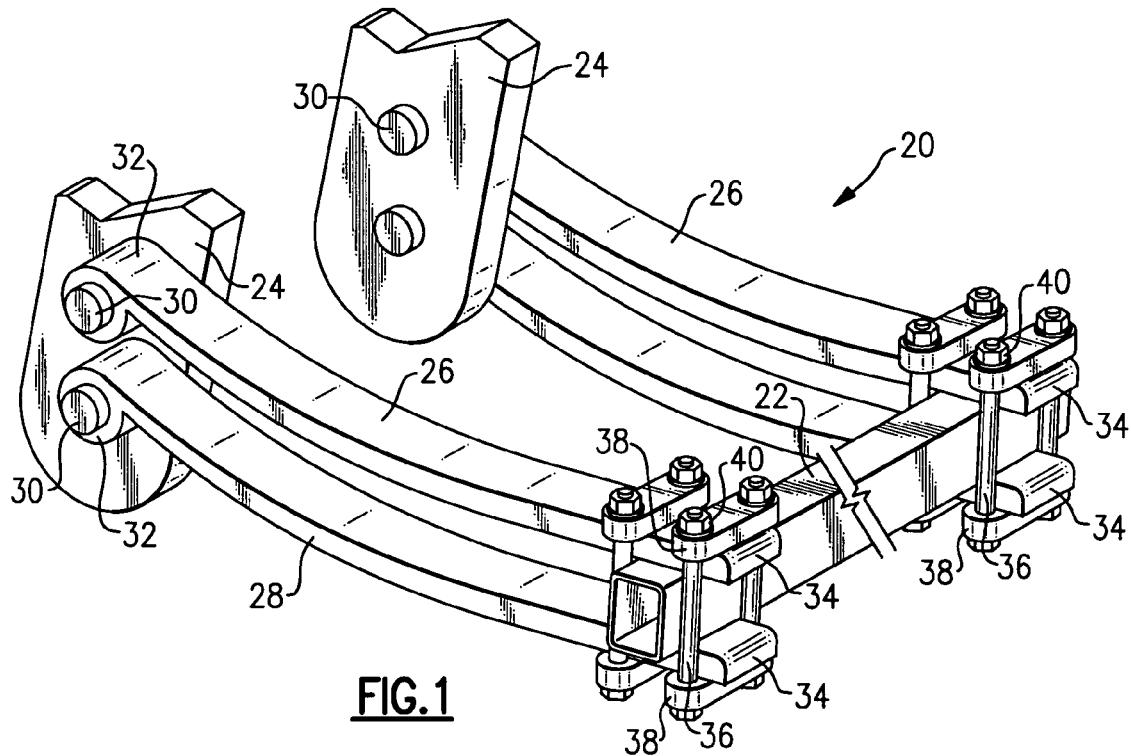
FIG. 1 shows a first embodiment of the present invention.

A first embodiment 20 of an inventive suspension is illustrated in FIG. 1. The suspension connects an axle 22, which may be a front axle for a heavy vehicle, to a vehicle frame 24. Plural trailing arms 26 and 28 are pivotally connected at 30 to the frame 24 at each lateral side. In fact, in the illustrations, frame brackets mount the arms 26 and 28 to the vehicle frame. For purposes of this application, the term "frame" would extend not only to the vehicle frame, but also to such brackets. Also, while a simple pin is shown as the pivot mount between the frame and the arms, other types of pivot arrangements such as the type known as a "bar pin" or bolted structures may be utilized. These aspects are known in the suspension art, and do not form a portion of this invention.

Arms 26 and 28 can be spring steel elements. A front end 32 of the arms 26 and 28 extends rearwardly to rear ends 34 that are rigidly mounted to the axle 22.

In this embodiment, separate plates 38 receive bolts 36 and nuts 40 to rigidly secure the rear ends 34 on each vertical side of the axle 22. The present invention thus achieves the ability to withstand higher braking forces due to the two separate arms 26 and 28. However, the complexity of the prior art multi-link design, including the bushings and connections at the pivot point, is reduced. By sizing the arms 26 and 28 to be larger, they can provide all of the required suspension. As will be seen, additional suspension elements can also be incorporated, if necessary.

While the arms 26 and 28 are shown mounted on opposed vertical sides of the axle 22, in fact, the arms could be fixed to the axle at a location vertically aligned with a side surface of the axle. In such an arrangement, the arms would have a bent end which could then be secured to the axle.

Figure 2:
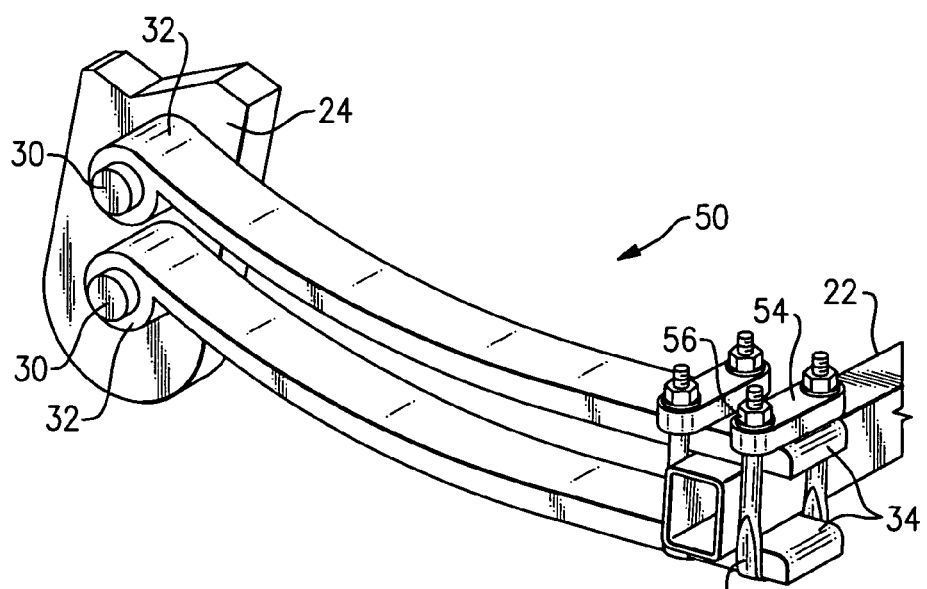
FIG. 2 shows a second embodiment of the present invention.

FIG. 2 shows a second embodiment 50, which is similar to the first embodiment, other than u-bolts 52 that replace the separate bolts 36. With this embodiment, mounting plates are not required at a lower end of the connection.

Figure 3:
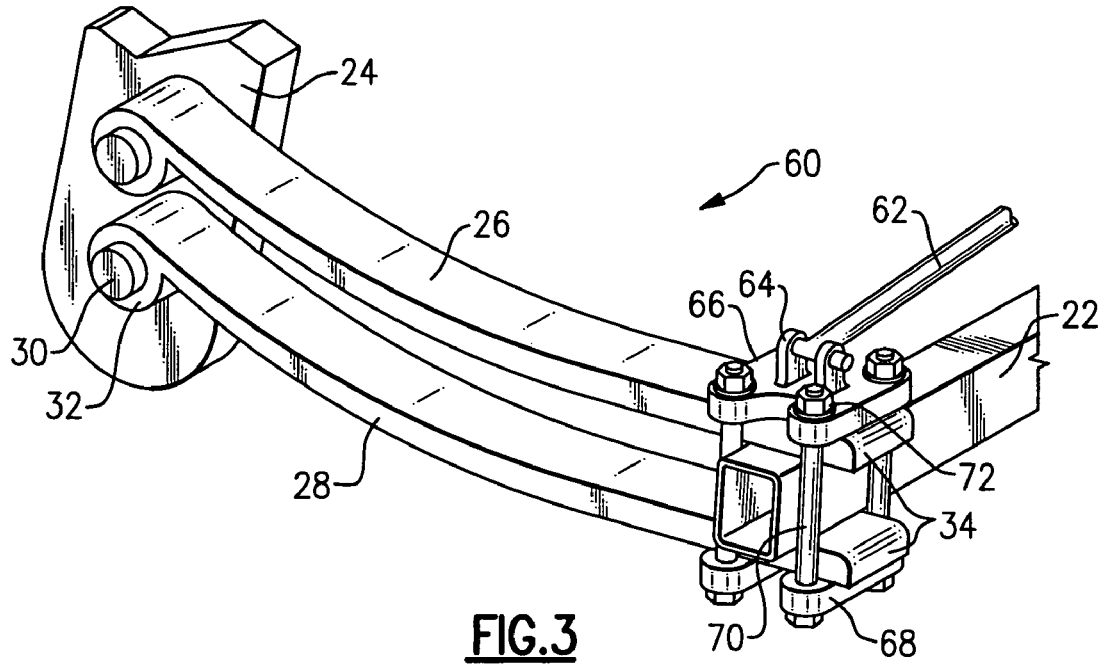
FIG. 3 shows a third embodiment of the present invention.

FIG. 3 shows an embodiment 60, which is similar to the first two embodiments, however a mount structure 64 is formed on an upper mount plate 66. The mount structure 66 mounts a lateral support rod 62 extending toward an opposed side of the vehicle, and an opposed suspension 60.

Figure 4:
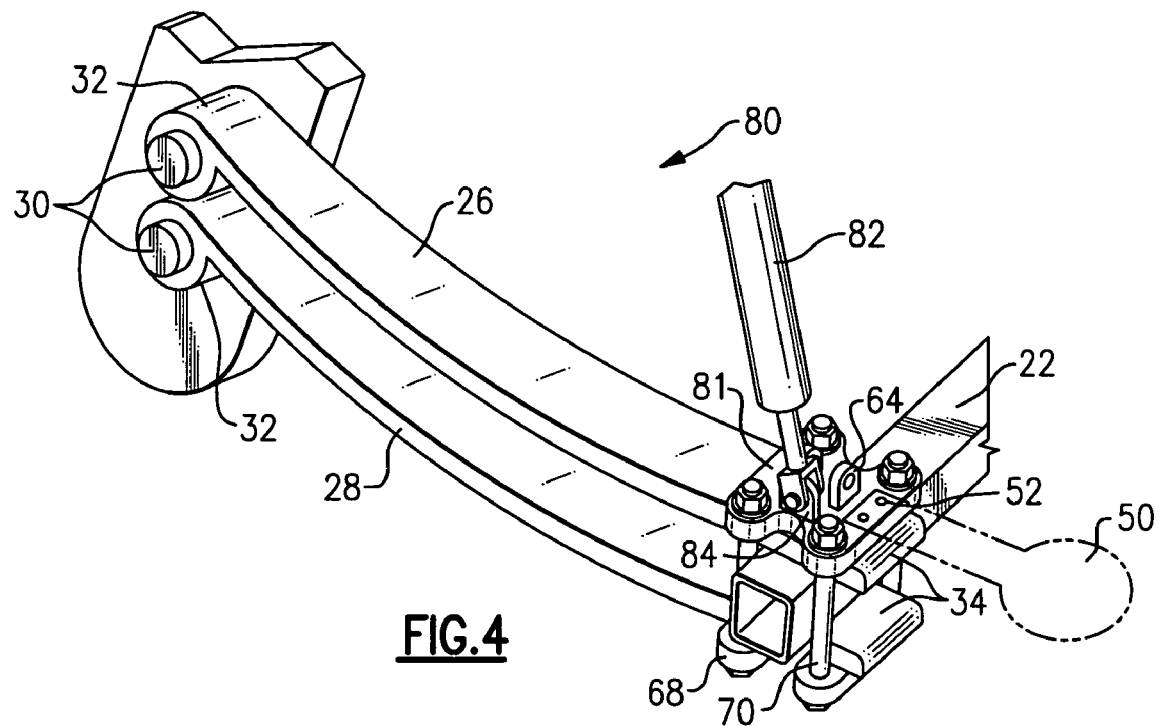
FIG. 4 shows a fourth embodiment of the present invention.

FIG. 4 shows an embodiment 80 wherein the mounting plate 81 includes the mount structure 64 for the lateral support rod, and also a mount location 84 to receive a shock absorber 82, shown schematically.

As further shown in FIG. 4, an air spring mount structure 50 is illustrated in phantom. Holes 52 in the plate 81 provide a mount location for securing the air spring support 50 to the body of axle 22. Alternatively, the air spring support 50 could be formed integrally with the axle 22.

Figure 5A:
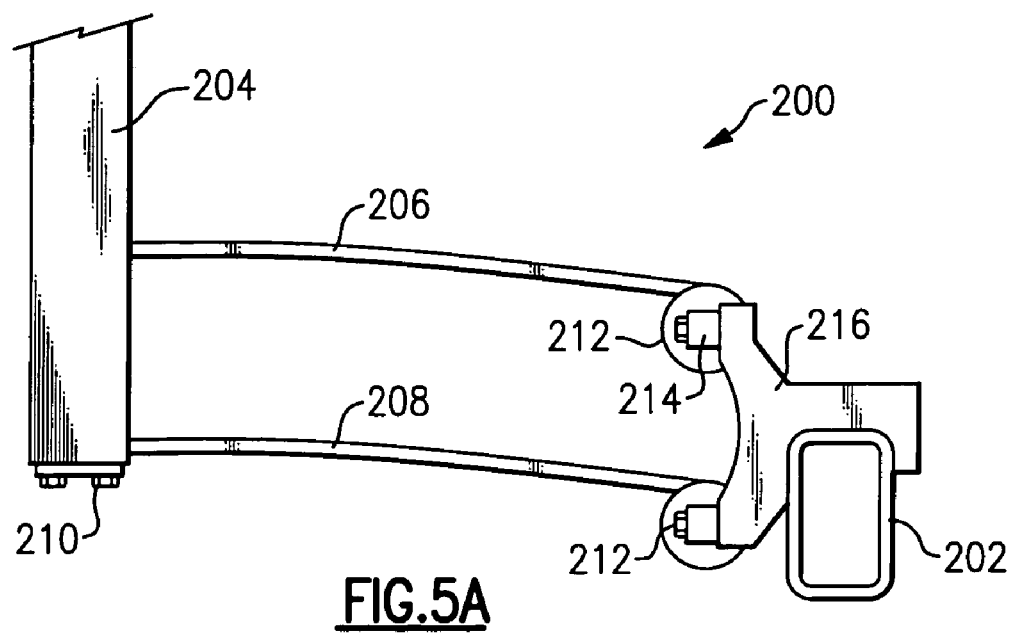
FIG. 5A shows a fifth embodiment of the present invention.

As shown in FIG. 5A, another embodiment 200 has an axle 202 connected to a frame 204 by arms 206 and 208. Arms 206 and 208 are rigidly attached to the frame 204 by bolts 210. The arms 206 and 208 are pivotally attached at 214 to a bracket 216 which is in turn welded to the axle 202. Bars 214 pin ends of the arms 206 and 208.

Figure 5B:
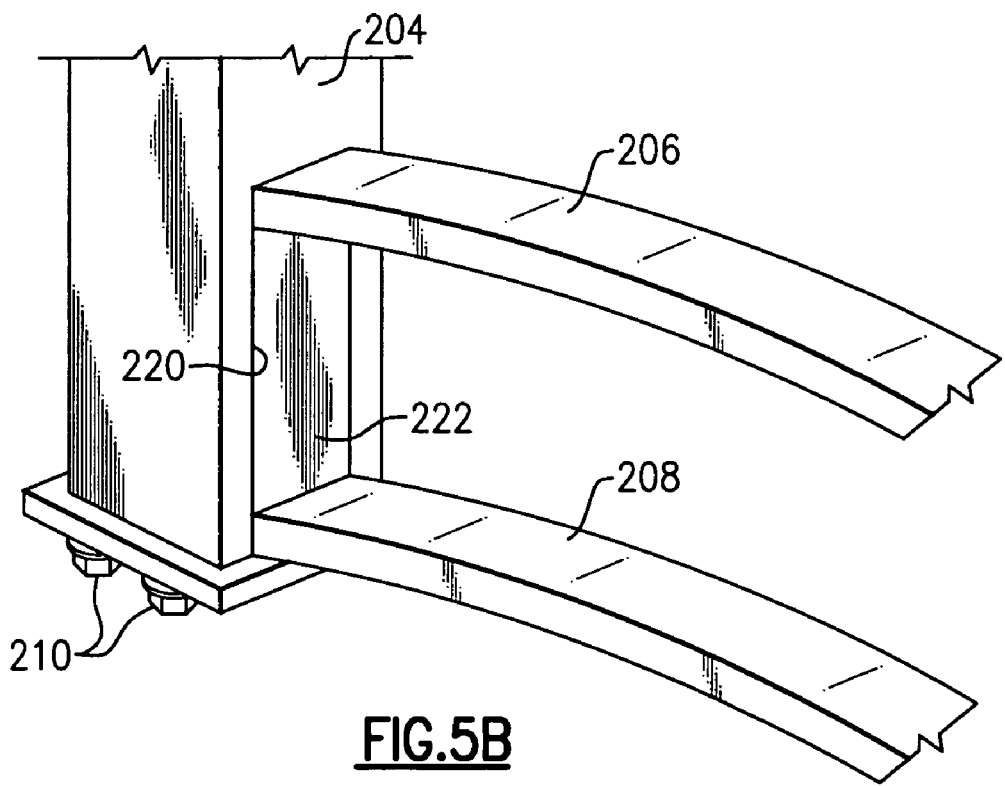
FIG. 5B shows another feature of the FIG. 5A embodiment.

As shown in FIG. 5B, the frame 204 has a slot 220 to rigidly receive the arms 206 and 208. A spacer 222 may be positioned between the arms 206 and 208, and bolts 210 are tightened to secure the arms within the slot 220.

While the present invention is disclosed and illustrated as a trailing arm suspension, the benefits of this invention would extend fully to a leading arm suspension.

As mentioned, by designing the size of the arms 26 and 28, and by including additional suspension elements, the present invention tailors a suspension that is able to withstand the higher braking forces which are expected to be seen by heavy vehicles, and in particular the front axles. On the other hand, the prior art concern of having numerous additional mount connections is eliminated.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A vehicle axle comprising:
an axle extending between opposed lateral sides; and
a plurality of arms at each lateral side of said axle, and said plurality of arms for being rigidly secured to one of said axle and a vehicle frame at one end, and pivotally secured to the other of said axle and the vehicle frame at an opposed end, and wherein said plurality of arms includes at least a first resilient suspension arm and a second resilient suspension arm at each lateral side that are vertically spaced apart from each other by a gap, and wherein an axle end of said plurality of arms is rigidly attached to the axle, and pivot mounts are provided at an opposed end of said plurality of arms to be pivotally mounted to the vehicle frame, and wherein at each lateral side. of said axle, said first resilient suspension arm is mounted vertically above said axle, and said second resilient suspension arm is mounted vertically below said axle.

2. The vehicle axle as set forth in claim 1, wherein bolts secure mount plates on each vertical side of said axle.

3. The vehicle axle as set forth in claim 1, wherein u-bolts secure said axle ends to said axle.

4. The vehicle axle as set forth in claim 3, wherein a pair of said u-bolts are disposed at each lateral side of said axle, and spaced with one on each longitudinal side of said axle to secure said axle ends of said plurality of arms to said axle.

5. The vehicle axle as set forth in claim 1, wherein mount structure for mounting said axle ends of said plurality of arms to said axle includes a mount plate, and said mount plate having a mount location for receiving a shock absorber.

6. The vehicle axle as set forth in claim 1, wherein mount structure for mounting said axle ends of said plurality of arms to said axle includes a mount plate, and said mount plate having a mount location for receiving an air spring.

7. The vehicle axle as set forth in claim 1, wherein said first and said second resilient suspension arms each comprise trailing arm spring members.

8. A vehicle axle comprising:
an axle extending between opposed lateral sides; and
a plurality of arms at each lateral side of said axle, and said plurality of arms for being rigidly secured to one of said axle and a vehicle frame at one end, and pivotally secured to the other of said axle and the vehicle frame at an opposed end, and wherein an axle end of said plurality of arms is rigidly attached to the axle, and pivot mounts are provided at an opposed end of said plurality of arms to be pivotally. mounted to the vehicle frame, and wherein mount structure for mounting said axle ends of said plurality of arms to said axle includes a mount plate, and said mount plate having mount structure for mounting a lateral support rod.

9. A vehicle comprising:
a vehicle frame;
an axle member extending between opposed lateral sides; and
a plurality of arms at each lateral side of said axle member, and said plurality of arms for being rigidly secured to one of said axle member and said vehicle frame at one end, and pivotally secured to the other of said axle member and said vehicle frame at an opposed end, and wherein said plurality of arms includes at least a first resilient suspension arm and a second resilient suspension arm at each lateral side that are vertically spaced apart from each other by a gap, and wherein an axle end of said plurality of arms is rigidly attached to said axle member, and pivot mounts are provided at an opposed end of said plurality of arms to pivotally mount said arms to said vehicle frame, and wherein at each lateral side of said axle member, said axle end of said first resilient suspension arm is mounted vertically above said axle member, and said axle end of said second resilient suspension arm is mounted vertically below said axle member.

10. The vehicle as set forth in claim 9, wherein u-bolts secure said axle ends to said axle member.

11. The vehicle as set forth in claim 10, wherein a pair of said u-bolts are disposed at each lateral side of said axle member, and are spaced with one on each longitudinal side of said axle member to secure said axle ends of said plurality of arms to said axle member.

12. The vehicle as set forth in claim 9, wherein said first and said second resilient suspension arms each comprise trailing arm spring members.

13. A vehicle comprising:
a vehicle frame;
an axle member extending between opposed lateral sides; and plurality of arms at each lateral side of said axle member, and said plurality of arms for being rigidly secured to one of said axle member and said vehicle frame at one end, and pivotally secured to the other of said axle member and said vehicle frame at an opposed end, and wherein an axle end of said plurality of arms is rigidly attached to said axle member, and pivot mounts are provided at an opposed end of said plurality of arms to pivotally mount said plurality of arms to said vehicle frame, and wherein at each lateral side of said axle member, said axle end of one of said plurality of arms is mounted vertically above said axle member, and said axle end of another of said plurality of arms is mounted vertically below said axle member with bolts securing mount plates on each vertical side of said axle member.

14. A vehicle comprising:
a vehicle frame;
an axle member extending between opposed lateral sides; and
a plurality of arms at each lateral side of said axle member, and said plurality of arms for being rigidly secured to one of said axle member and said vehicle frame at one end, and pivotally secured to the other of said axle member and said vehicle frame at an opposed end, and wherein said plurality of arms includes at least a first suspension arm and a second suspension arm at each lateral side that are vertically spaced apart from each other by a gap, and wherein an axle end of said plurality of arms is rigidly attached to said axle member, and pivot mounts are provided at an opposed end of said plurality of arms to pivotally mount said arms to said vehicle frame wherein mount structure for mounting said axle ends of said plurality of arms to said axle member includes a mount plate, and said mount plate having mount structure for mounting a lateral support rod.

15. A vehicle comprising:
a vehicle frame;
an axle member extending between opposed lateral sides; and
a plurality of arms at each lateral side of said axle member, and said plurality of arms for being rigidly secured to one of said axle member and said vehicle frame at one end, and pivotally secured to the other of said axle member and said vehicle frame at an opposed end, and wherein said plurality of arms includes at least a first suspension arm and a second suspension arm at each lateral side that are vertically spaced apart from each other by a gap, and wherein an axle end of said plurality of arms is rigidly attached to said axle member, and separate pivot mounts are provided for each arm at an opposed end of said plurality of arms to independently pivotally mount each of said arms to said vehicle frame wherein mount structure for mounting said axle ends of said plurality of arms to said axle member includes a mount plate, and said mount plate having a mount location for receiving a shock absorber.

16. A vehicle comprising:
a vehicle frame;
an axle member extending between opposed lateral sides; and
a plurality of arms at each lateral side of said axle member, and said plurality of arms for being rigidly secured to one of said axle member and said vehicle frame at one end, and pivotally secured to the other of said axle member and said vehicle frame at an opposed end, and wherein said plurality of arms includes at least a first suspension arm and a second suspension arm at each lateral side that are vertically spaced apart from each other by a gap, and wherein an axle end of said plurality of arms is rigidly attached to said axle member, and separate pivot mounts are provided for each arm at an opposed end of said plurality of arms to independently pivotally mount each of said arms to said vehicle frame wherein mount structure for mounting said axle ends of said plurality of arms to said axle member includes a mount plate, and said mount plate having a mount location for receiving an air spring.

17. A vehicle axle comprising:
an axle body;
a plurality of suspension arms to be rigidly secured to one of said axle body and a vehicle frame at a rigid mount end, and pivotally secured to the other of said axle body and the vehicle frame at a pivot mount end, and wherein said plurality of suspension arms includes at least a first resilient suspension arm and a second resilient suspension arm that are vertically spaced apart from each other by a gap, said first and said second resilient suspension arms being pivotally mounted to the vehicle frame at said pivot mount end and rigidly mounted to said axle body at said rigid mount end, and wherein each of said first and said second resilient suspension arms includes a separate pivot mount at said pivot mount end; and
wherein said separate pivot mounts comprise a first pivot mount defining a first pivot axis for said first resilient suspension arm and a second pivot mount defining a second pivot axis for said second resilient suspension arm that is different than said first pivot axis.

18. The vehicle axle as set forth in claim 17, wherein said first and said second pivot mounts are vertically spaced apart from each other.

19. The vehicle axle as set forth in claim 17, wherein said first resilient suspension arm is mounted vertically above said axle body, and said second resilient suspension arm is mounted vertically below said axle body.

* * * * *

UNITED STATES PATENT AND TRADEMARK OFFICE
CERTIFICATE OF CORRECTION

| | |
|---|---|
| PATENT NO. | : 7,549,659 B2 |
| APPLICATION NO. | : 11/442761 |
| DATED | : June 23, 2009 |
| INVENTOR(S) | : Reineck |

Page 1 of 1

It is certified that error appears in the above-identified patent and that said Letters Patent is hereby corrected as shown below:

IN THE CLAIMS:

Claim 1, Column 3, Line 32: Replace "side." with "side"

Claim 8, Column 3, Line 65: Replace "pivotally." with "pivotally"

Signed and Sealed this

Twenty-fifth Day of August, 2009

David J. Kappos
*Director of the United States Patent and Trademark Office*